United States Patent
Tzivanis et al.

(10) Patent No.: US 11,933,430 B2
(45) Date of Patent: Mar. 19, 2024

(54) COMPOSITE TUBE AND METHOD OF MAKING

(71) Applicant: SAINT-GOBAIN PERFORMANCE PLASTICS CORPORATION, Solon, OH (US)

(72) Inventors: Michael J. Tzivanis, Chicopee, MA (US); James Ludlow, Medina, OH (US)

(73) Assignee: SAINT-GOBAIN PERFORMANCE PLASTICS CORPORATION, Solon, OH (US)

(*) Notice: Subject to any disclaimer, the term of this patent is extended or adjusted under 35 U.S.C. 154(b) by 22 days.

(21) Appl. No.: 17/663,882

(22) Filed: May 18, 2022

(65) Prior Publication Data

US 2022/0373110 A1 Nov. 24, 2022

Related U.S. Application Data

(60) Provisional application No. 63/189,930, filed on May 18, 2021.

(51) Int. Cl.
| | |
|---|---|
| *F16L 11/04* | (2006.01) |
| *B32B 1/08* | (2006.01) |
| *B32B 7/12* | (2006.01) |
| *B32B 27/08* | (2006.01) |
| *B32B 37/15* | (2006.01) |

(52) U.S. Cl.
CPC ............... *F16L 11/04* (2013.01); *B32B 1/08* (2013.01); *B32B 7/12* (2013.01); *B32B 27/08* (2013.01); *B32B 37/153* (2013.01); *B32B 2310/08* (2013.01); *B32B 2597/00* (2013.01)

(58) Field of Classification Search
CPC .................................. F16L 9/121; F16L 11/04
USPC ............................. 138/141, 137, 140, DIG. 1
See application file for complete search history.

(56) References Cited

U.S. PATENT DOCUMENTS

| | | | |
|---|---|---|---|
| 3,014,799 A | 12/1961 | Oster | |
| 3,455,337 A | 7/1969 | Cook | |
| 5,799,704 A * | 9/1998 | Andre | F16L 11/04 138/146 |
| 6,187,400 B1 | 2/2001 | Woo et al. | |
| 6,451,915 B1 | 9/2002 | Ellul et al. | |
| 7,132,141 B2 * | 11/2006 | Thullen | B32B 27/32 428/476.3 |
| 8,956,706 B2 | 2/2015 | Siddhamalli et al. | |
| 9,982,809 B2 | 5/2018 | Nadeau et al. | |
| 10,381,128 B2 | 8/2019 | Fujita et al. | |
| 2002/0139428 A1* | 10/2002 | Kertesz | F16L 11/127 138/140 |
| 2003/0087137 A1 | 5/2003 | Gagnon et al. | |
| 2004/0127641 A1 | 7/2004 | Fagrell et al. | |
| 2005/0005989 A1 | 1/2005 | Roloff | |
| 2005/0148924 A1 | 7/2005 | Goehl et al. | |

(Continued)

OTHER PUBLICATIONS

International Search Report and Written Opinion for PCT Application No. PCT/US2022/072393, dated Sep. 5, 2022, 11 pages.

*Primary Examiner* — Patrick F Brinson
(74) *Attorney, Agent, or Firm* — Abel Schillinger, LLP; Chi Suk Kim

(57) ABSTRACT

A composite tube includes a first layer including a cross-linked polyolefin elastomer, wherein the first layer is configured for fluid contact; and a second layer adjacent to the first layer, the second layer including an elastomer.

20 Claims, 1 Drawing Sheet

(56) References Cited

U.S. PATENT DOCUMENTS

| | | |
|---|---|---|
| 2006/0275572 A1 | 12/2006 | Bonnet et al. |
| 2010/0113698 A1 | 5/2010 | Walton et al. |
| 2014/0193628 A1 | 7/2014 | Esseghir et al. |
| 2014/0234561 A1 | 8/2014 | Liu et al. |
| 2015/0252918 A1 | 9/2015 | Garver et al. |
| 2016/0178091 A1 | 6/2016 | Nadeau et al. |
| 2017/0326584 A1 | 11/2017 | Lennon et al. |

\* cited by examiner

COMPOSITE TUBE AND METHOD OF MAKING

CROSS-REFERENCE TO RELATED APPLICATION(S)

This application claims priority under 35 U.S.C. § 119(e) to U.S. Provisional Application No. 63/189,930, entitled "A COMPOSITE TUBE AND METHOD OF MAKING," by Michael J. TZIVANIS et al., filed May 18, 2021, which is assigned to the current assignee hereof and incorporated herein by reference in its entirety.

FIELD OF THE DISCLOSURE

This disclosure, in general, relates to a composite tube and method for making same.

BACKGROUND

Many industries utilize peristaltic pump tubing for the delivery and removal of fluids. Since peristaltic pump tubing may be used in a variety of industries, thermoplastic elastomers are typically used that are non-toxic, flexible, thermally stable, have low chemical reactivity, and can be produced in a variety of sizes. With a peristaltic pump, rollers are in contact with the tubing. Unfortunately, conventional pump tubing has a limited lifespan due to the prolonged cyclic damage from the rollers and/or degradation of the tubing by the fluids being pumped. It would be advantageous, however, to increase the life of a peristaltic pump tube.

Accordingly, an improved peristaltic pump tube with a prolonged lifespan is desired.

SUMMARY

In an embodiment, a composite tube includes a first layer including a cross-linked polyolefin elastomer, wherein the first layer is configured for fluid contact; and a second layer adjacent to the first layer, the second layer including an elastomer.

In an embodiment, a method of forming a composite tube includes: providing a first layer including a polyolefin elastomer; providing a second layer including an elastomer overlying the first layer; and cross-linking at least the first layer with a radiation source, a cross-linking agent, or combination thereof to substantially cross-link the polyolefin elastomer.

In yet another embodiment, a composite tube includes a first layer including a cross-linked polyethylene-based elastomer; and a second layer adjacent to the first layer, the second layer including a diene elastomer.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
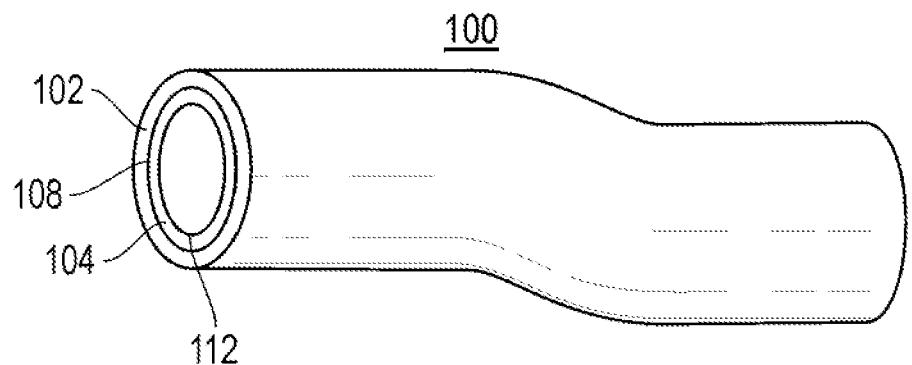
FIGS. 1 and 2 include illustrations of exemplary peristaltic pump tubes.

The following description in combination with the figures is provided to assist in understanding the teachings disclosed herein. The following discussion focuses on specific implementations and embodiments of the teachings. This focus is provided to assist in describing the teachings and should not be interpreted as a limitation on the scope or applicability of the teachings.

As used herein, the terms "comprises", "comprising", "includes", "including", "has", "having", or any other variation thereof, are open-ended terms and should be interpreted to mean "including, but not limited to . . . ." These terms encompass the more restrictive terms "consisting essentially of" and "consisting of." In an embodiment, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts. Unless indicated otherwise, all measurements are at about 25° C. For instance, values for viscosity are at 25° C., unless indicated otherwise.

In a particular embodiment, a composite tube includes at least a first layer and a second layer. The first layer includes a cross-linked polyolefin elastomer. As used herein, "cross-linked polyolefin elastomer" is used to describe a polyolefin elastomer that has been cross-linked. The polyolefin elastomer may be cross-linked with a radiation source, a cross-linking agent, or combination thereof. In an embodiment, the first layer is configured for fluid contact. For instance, the first layer is the inner layer of the composite tube. When cross-linked, the cross-linked polyolefin elastomer advantageously provides a peristaltic pump tube that has an unexpected and advantageous pump life.

Typically, the polyolefin elastomer includes any reasonable olefin-based monomer. A typical polyolefin elastomer may include a homopolymer, a copolymer, a terpolymer, an alloy, or any combination thereof formed from a monomer, such as a C2-C10 carbon-based elastomer. In an embodiment, the olefin monomer includes, for example, ethylene, propylene, butene, pentene, methyl pentene, octene, or any combination thereof to form the polyolefin elastomer. In an embodiment, the polyolefin elastomer may be a copolymer of ethylene with propylene or with an alpha-olefin or a copolymer of polypropylene with ethylene or with an alpha-olefin, the polyolefin made by metallocene or non-metallocene polymerization processes. In an embodiment, the polyolefin elastomer may include a copolymer of ethylene with a polar vinyl monomer such as acetate (EVA), acrylic acid (EAA), methyl acrylate (EMA), methyl methacrylate (EMMA), ethyl acrylate (EEA) and butyl acrylate (EBA). In another embodiment, the polyolefin elastomer can be a terpolymer of ethylene, maleic anhydride and an acrylate. In yet another embodiment, the polyolefin elastomer can be an ionomer of ethylene and acrylic acid or methacrylic acid and optionally, a third monomer. In an embodiment, the third monomer includes any reasonable acrylate.

An exemplary polyolefin elastomer includes high density polyethylene (HDPE), medium density polyethylene (MDPE), low density polyethylene (LDPE), ultra or very low density polyethylene (VLDPE), ethylene propylene copolymer, ethylene butene copolymer, polypropylene (PP), polybutene, polybutylene, polypentene, polymethylpentene, polystyrene, ethylene propylene rubber (EPR), Ziegler-Natta olefin, metallocene olefin, blend thereof, polymeric composition thereof, and the like. The polyolefin elastomer further includes an olefin-based random copolymer, an olefin-based impact copolymer, an olefin-based block copolymer, an olefin-based specialty elastomer, an olefin-based specialty plastomer, a blend thereof, a polymeric composition thereof, and the like. In an example, the polyolefin elastomer includes a polyethylene-based elastomer. Commercially available examples of metallocene polyolefins include polyethylene, polyethylene based elastomers such as Engage™ available from Dow Chemical Co. and polypropylene, polypropylene based elastomers such as Versify™ available from Dow Chemical Co., Vistamaxx™ available from Exxon Mobil Chemical, random polypropylene copolymers available from Flint Hills Resources, Exxon, Dow, and the like. Commercially available examples of Ziegler-Natta olefin olefins include Profax™ and Moplen™ available from LyondellBasell.

The polyolefin elastomer may include any reasonable additive. In an embodiment, the polyolefin elastomer may include a cross-linking agent. Any reasonable cross-linking agent is envisioned. For instance, cross-linking of the polyolefin elastomer may be facilitated by a chemical crosslinking agent, such as a peroxide, an azo compound, a silane, or any combination thereof. An exemplary cross-linking agent includes a free radical generating chemical, which when exposed to heat decomposes to form at least one, and typically two or more free radicals to effect cross-linking. In an exemplary embodiment, the polyolefin elastomer may be prepared by dry blending solid state forms of polymer and the cross-linking agent, i.e., in powder form. Alternatively, the material may be prepared in liquid form, sorbed in inert powdered support or by preparing coated pellets, or the like.

An exemplary organic peroxide cross-linking agent includes, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. In another exemplary embodiment, an azo compound may be used. Any reasonable azo compound is envisioned. A suitable azo compound is 2,2'-azobis (2-ethoxy silane).

An exemplary silane includes an unsaturated silane that includes an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. An example of a hydrolyzable group includes a methoxy group, an ethoxy group, a formyloxy group, an acetoxy group, a proprionyloxy group, an alkyl group, an arylamino group, or any combination thereof. A particular silane is an unsaturated alkoxy silane that can be grafted onto the polymer. In particular, the silane may include vinyl trimethoxy silane, vinyl triethoxy silane, gamma-(meth)acryloxy propyl trimethoxy silane, vinyl methyldimethoxy silane, or any combination thereof.

The amount of cross-linking agent may vary widely depending upon the nature of the polyolefin elastomer, the cross-linking agent, the processing conditions, the grafting efficiency, the ultimate application, and similar factors. Any reasonable amount of cross-linking agent is envisioned. Typically, at least 0.1 parts per hundred resin (phr), such as at least about 0.7 phr, is used, based on the total weight of the polyolefin elastomer. Generally, the amount of cross-linking agent does not exceed 5 phr, such as not greater than about 3 phr. In an embodiment, the cross-linking agent is a peroxide present in the polyolefin elastomer at an amount of about 0.2 phr to about 5 phr, such as about 1 phr to about 3 phr.

In an embodiment, the polyolefin elastomer may include an impact modifier and an additive such as a heat stabilizer, an antioxidant, a UV stabilizer, a clarifying agent, a lubricant, a wax, an antistatic agent, or combination thereof. Exemplary radiation stabilizers include hindered amine light stabilizer (HALS) such as Tinuvin 770 supplied by CIBA. Exemplary impact modifiers include a polyolefin elastomer such as Engage® that is polyethylene modified with butene or hexene as comonomers. Typically, an additive package in the polyolefin elastomer is present at an amount not greater than about 1% by weight and impact modifier in the polyolefin elastomer is present at an amount of not greater than about 10% weight or even not greater than about 5% by weight of the total weight of the polyolefin elastomer.

In an embodiment, a plasticizer may be provided in the polyolefin elastomer composition. In a particular embodiment, the plasticizer is a mineral oil. Any suitable mineral oil may be envisioned. In a particular embodiment, the mineral oil is paraffinic, naphthenic, or a polymeric composition thereof with substantially zero aromatic content. In a particular embodiment, a mineral oil may be used at an amount of about 0% by weight to about 70% by weight, such as about 10% by weight to about 70% by weight, such as about 20% by weight to about 70% by weight of the total weight of the polyolefin elastomer. In an embodiment, the mineral oil is present at an amount of about 0% by weight to about 40% by weight, such as about 1% by weight to about 40% by weight, or even about 5% by weight to about 40% by weight of the total weight of the polyolefin elastomer. It will be appreciated that the mineral oil content can be within a range between any of the minimum and maximum values noted above. In an embodiment, the polyolefin elastomer is substantially plasticizer-free. "Substantially plasticizer-free" as used herein refers to a polyolefin elastomer that includes mineral oil present at less than about 0.1% by weight of the total weight of the polymeric elastomer.

In an exemplary embodiment, the polyolefin elastomer further includes any additive envisioned such as a heat stabilizer, a lubricant, a filler, an antioxidant, a co-agent, or any combination thereof. Exemplary lubricants include a silicone oil, a wax, a slip aid, an antiblock agent, and the like. Exemplary lubricants further include silicone grafted polyolefin, a polyethylene or polypropylene wax, an Oleic acid amide, a erucamide, a stearate, a fatty acid ester, and the like. Typically, the lubricant may be present at less than about 2.0% by weight of the total weight of the polyolefin elastomer. In an embodiment, the lubricant may be present at less than about 0.5% by weight of the total weight of the polyolefin elastomer. Exemplary antioxidants include a phenolic, a hindered amine antioxidant, a combination thereof, and the like. Exemplary fillers include calcium carbonate, talc, a radio-opaque filler such as barium sulfate, bismuth oxychloride, any combination thereof, and the like. Typically, a filler may be present at an amount of not greater than about 50% by weight of the total weight of the polyolefin elastomer, such as not greater than about 40% by weight of the total weight of the polyolefin elastomer, or even not greater than about 30% by weight of the total weight of the polyolefin elastomer. Any co-agent is envisioned such as, for example, bis-phenol AF, triaryl isocyanurate (TAIL), Triaryl cyanurate (TAC), an organic peroxide, 1,3 butylene glycol dimethacrylate, diethylene glycol dimethacrylate, zinc diacrylate, zinc methacrylate, or any combination thereof. Any reasonable amount of co-agent is envisioned. Alternatively, the polyolefin elastomer may be free of additives such as a tackifier, a heat stabilizer, a lubricant, a filler, and an antioxidant.

In an embodiment, the polyolefin elastomer of the first layer is essentially 100% of a polyolefin elastomer. In some embodiments, the polyolefin elastomer consists essentially of polypropylene, polyethylene, a copolymer of ethylene with propylene, a copolymer of ethylene with an alpha-olefin, a copolymer of ethylene with a polar vinyl monomer, a terpolymer of ethylene, maleic anhydride, and an acrylate, an ionomer of ethylene and acrylic acid and optionally a third monomer, an ionomer of ethylene and methacrylic acid and optionally a third monomer, or combination thereof. As used herein, the phrase "consists essentially of" used in connection with the layer precludes the presence of materials that affect the basic and novel characteristics of the polymeric composition, although, commonly used processing agents and additional additives may be used in the layer. In an embodiment, "consists essentially of" precludes the presence of other polymers, such as a non-polyolefin polymer. In an embodiment, the polyolefin elastomer consists essentially of polypropylene, polyethylene, a copolymer of ethylene with propylene, a copolymer of ethylene with an alpha-olefin, a copolymer of ethylene with a polar vinyl monomer, a terpolymer of ethylene, maleic anhydride, and an acrylate, an ionomer of ethylene and acrylic acid and optionally a third monomer, an ionomer of ethylene and methacrylic acid and optionally a third monomer, or combination thereof and a cross-linking agent.

In an embodiment, the polyolefin elastomer consists of polypropylene, polyethylene, a copolymer of ethylene with propylene, a copolymer of ethylene with an alpha-olefin, a copolymer of ethylene with a polar vinyl monomer, a terpolymer of ethylene, maleic anhydride, and an acrylate, an ionomer of ethylene and acrylic acid and optionally a third monomer, an ionomer of ethylene and methacrylic acid and optionally a third monomer, or combination thereof. In an embodiment, the polyolefin elastomer consists of polypropylene, polyethylene, a copolymer of ethylene with propylene, a copolymers of ethylene with an alpha-olefin, a copolymer of ethylene with a polar vinyl monomer, a terpolymer of ethylene, maleic anhydride, and an acrylate, an ionomer of ethylene and acrylic acid and optionally a third monomer, an ionomer of ethylene and methacrylic acid and optionally a third monomer, or combination thereof and a cross-linking agent.

In an embodiment, the polyolefin elastomer is cross-linked with the cross-linking agent, irradiating with a radiation source, or combination thereof. In a particular embodiment, the radiation source is sufficient to substantially cross-link the polyolefin elastomer. "Substantially cross-link" as used herein refers to >90% of final crosslinking density, as determined for instance by rheometer data (90% cure means the material reaches 90% of the maximum torque as measured by ASTM D5289). In an embodiment, relative amount of crosslinking can be assessed via % insoluble (gel content) in a known solvent for the polymer. Crosslink density ($mol/cm^3$) can be measured using swell testing. Applicable methods include ASTMD2765. Any reasonable radiation source is envisioned such as ionizing radiation. Ionizing radiation includes high-energy radiation capable of generating ions and includes electron beam (e-beam) radiation, gamma radiation, and x-ray radiation. In a particular example, e-beam ionizing radiation includes an electron beam generated by a Van de Graaff generator, an electron-accelerator, or an x-ray. In an example, the gamma radiation or e-beam radiation is at about 0.1 MRad to about 50 MRad. Doses between about 10 KGy to about 200 KGy (about 1 Mrad to about 20 Mrad) are typical. In an exemplary embodiment, for cross-linking of the blend by gamma rays, about 1 Mrad to about 10 Mrad of radiation from a $^{60}Co$ source can be used. Further, any number of applications of radiation energy may be applied.

In a particular example, once cross-linked, the cross-linked polyolefin elastomer has a degree of crystallinity. For example, the cross-linked polyolefin elastomer may have at least about 35% crystallinity. In a particular example, the cross-linked polyolefin elastomer may have a crystallinity of at least about 50%, such as at least about 60% or at least about 70% crystallinity. In a particular example, the cross-linked polyolefin elastomer may be a high crystallinity polyolefin. Alternatively, the cross-linked polyolefin elastomer may be a low crystallinity polyolefin elastomer, having a crystallinity not greater than 35%. Low crystallinity polyolefins elastomer may improve clarity in particular applications. Alternatively, clarifying or nucleating agents can be used to provide clarity without little to no deleterious impact on the physical properties of the cross-linked polyolefin. In an example, the nucleating agents may accelerate crystallization, resulting in smaller crystalline domains.

In an embodiment, the cross-linked polyolefin elastomer has a flexural modulus lower than 10,000 pounds per square inch (psi), such as less than 8,000 psi. In an embodiment, the cross-linked polyolefin elastomer has a melting temperature of greater than 80° C. Further, the cross-linked polyolefin elastomer has a glass transition temperature (Tg) of less than 0° C., such as less than −20° C. Additionally, the cross-linked polyolefin elastomer has other desirable properties such as an advantageous tan delta, tear resistance, or combination of these properties. For instance, the tan delta of the cross-linked polyolefin elastomer will be lower than a non-crosslinked polyolefin elastomer.

In particular embodiments, the second layer adjacent the first layer is an elastomer. Any elastomer is envisioned. An elastomer includes a thermoset elastomer, a thermoplastic elastomer, or combination thereof. In more particular embodiments, the elastomer can include an elastomeric polymer such as a polystyrene, a polyester, a silicone elastomer, a silicone copolymer, a silicone thermoplastic vulcanizate, a copolyester, a polyamide, a fluoropolymer, a polyethylene, a polypropylene, a polyether-ester copolymer, a thermoplastic urethane, a polyether amide block copolymer, a polyamide copolymer, a styrene block copolymer, a polycarbonate, a polyolefin elastomer, a diene elastomer, a natural rubber, a nitrile rubber, a thermoplastic vulcanizate, an ionomer, a polyoxymethylene (POM), an acrylonitrile butadiene styrene (ABS), an acetal, an acrylic, a polyvinyl chloride (PVC), or a combination thereof. In a particular embodiment, the second layer is a diene elastomer.

In a particular example, the diene elastomer may be a copolymer formed from at least one diene monomer. For example, the diene elastomer may be a copolymer of ethylene, propylene and diene monomer (EPDM), a thermoplastic EPDM composite, or combination thereof. An exemplary diene monomer may include a conjugated diene, such as butadiene, isoprene, chloroprene, or the like; a nonconjugated diene including from 5 to about 25 carbon atoms, such as 1,4-pentadiene, 1,4-hexadiene, 1,5-hexadiene, 2,5-dimethyl-1,5-hexadiene, 1,4-octadiene, or the like; a cyclic diene, such as cyclopentadiene, cyclohexadiene, cyclooctadiene, dicyclopentadiene, or the like; a vinyl cyclic ene, such as 1-vinyl-1-cyclopentene, 1-vinyl-1-cyclohexene, or the like; an alkylbicyclononadiene, such as 3-methylbicyclo-(4,2,1)-nona-3,7-diene, or the like; an indene, such as methyl tetrahydroindene, or the like; an alkenyl norbornene, such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, or the like; a tricyclodiene, such as 3-methyltricyclo (5,2,1,0$^2$,6)-deca-3,8-diene or the like; or any combination thereof.

In a particular example, the elastomer of the second layer is self-bonding. For a self-bonding elastomer, a modification to the elastomer, either through grafting chemically active functionalities onto the polymeric chains within the polymer or through incorporation of a separated chemical component into the matrix of the polymer, leads to enhanced bonding between the polymer and the layer it is directly adjacent to. Any chemically active functionalities or chemical components are envisioned.

In an exemplary embodiment, the elastomer of the second layer may further include any reasonable additive envisioned such as a heat stabilizer, a lubricant, a filler, an antioxidant, a co-agent, a radiation stabilizer, or any combination thereof. Alternatively, the second layer may be substantially free of an additive. "Substantially free" as used herein refers to less than about 1.0% by weight, or even less than about 0.1% by weight of the total weight of the elastomer of the second layer.

In an embodiment, the outer layer of the composite tube may have an advantageous coefficient of friction. For instance, the elastomer of the second layer may include a coefficient of friction additive, a low coefficient of friction coating, a surface treatment, or combination thereof to decrease the coefficient of friction compared to a composite tube without any such modification. In an embodiment, any coefficient of friction additive is envisioned that decreases the coefficient of friction of the peristaltic pump tube. For instance, the elastomer has a lower coefficient of friction with the addition of the coefficient of friction additive compared to an elastomer without a coefficient of friction additive. In an embodiment, any reasonable coefficient of friction additive is envisioned. For instance, the coefficient of friction additive includes a fluorinated oil, a fluoropolymer powder such as a polytetrafluoroethylene (PTFE) powder, a perfluoropolyether (PFPE) synthetic oil, graphite, a silicone oil, a modified silicone additive such as an organo-modified siloxane (OMS), a fluorinated silicone oil, an olefin based additive such as polyethylene wax or poly alpha-olefin oil, a glycerol mono-oleate, a long chain carboxylic acid, boron nitride, or combination thereof. Any low coefficient of friction coating is envisioned. Exemplary coatings include, but are not limited to, an amorphous carbon coating, a fluoropolymer-based coating, a silicone-based coating, any combination thereof, and the like. Any method of applying the coating is envisioned and includes, but is not limited to vapor deposition, a sputtering process, dip coating, spray coating, or combination thereof. For a surface treatment, the outside surface of the composite tube in contact with the rollers of a peristaltic pump may be surface treated. Surface treatment may include a modification to the outer surface of the elastomer leading to decreased coefficient of friction between the outer layer and the pump rollers. Any surface treatment envisioned. In an embodiment, the surface treatment includes fluorinating the surface.

As illustrated in FIG. 1, a composite tube 100 is an elongated annular structure with a hollow central bore. The composite tube 100 includes an outer layer 102 and an inner layer 104. The outer layer 102 may be directly in contact with and may directly bond to an inner layer 104 along an outer surface 108 of the inner layer 104. For example, the outer layer 102 may directly bond to the inner layer 104 without intervening adhesive layers. In an exemplary embodiment, the composite tube 100 includes two layers where the inner layer 104 is the first layer and outer layer 102 is the second layer as described for the composite tube. The inner layer 104 is configured for fluid contact. For instance, an inner surface 112 defines a central lumen of the tube for fluid flow therethrough.

Any dimensions of the composite tube 100 are envisioned. For instance, any thickness of the layers 102, 104 is envisioned and is typically dependent upon the final properties desired for the composite tube 100. In an embodiment, the ratio of the thickness of the inner layer 102 to the outer layer 104 may be 20:1 to 1:20, such as 10:1 to 1:10. It will be appreciated that the ratio of the thickness can be within a range between any of the minimum and maximum values noted above. In an embodiment, the outer layer 102 has greater thickness than the inner layer 104.

The total tube thickness of the composite tube 100 may be at least about 3 mils to about 250 mils, such as about 3 mils to about 200 mils, or about 3 mils to about 125 mils. In an embodiment, the inner layer 104 has a thickness of about 1 mil to about 50 mils, such as about 3 mils to about 30 mils, or about 1 mil to about 15 mils. In an embodiment, the outer layer 102 makes up for the difference of the total tube thickness.

In a particular embodiment, the outside diameter of the composite tube 100 is about 250 mils inches to about 5000 mils, such as about 250 mils to about 2000 mils. It will be appreciated that the outside diameter can be within a range between any of the minimum and maximum values noted above. In an embodiment, the inner diameter of the composite tube 100 is about 5 mils to about 4000 mils, such as about 30 mils to about 4000 mils, such as about 60 mils to about 1000 mils. It will be appreciated that the inner diameter of the composite tube 100 can be within a range between any of the minimum and maximum values noted above.

Further, the composite tube 100 can have a length, which is a distance between a distal end and a proximal end of the composite tube 100. In a further embodiment, the length of the composite tube 100 can be at least about 2 meters, such as at least about 5 meters, such as at least about 10 meters. The length is generally limited by pragmatic concerns, such as storing and transporting long lengths, or by customer demand.

Although the cross-section of the composite tube 100 perpendicular to an axial direction of the body in the illustrative embodiment shown in FIG. 1 has a circular shape, the cross-section of the composite tube 100 perpendicular to the axial direction of the body can have any cross-section shape envisioned.

Figure 2:
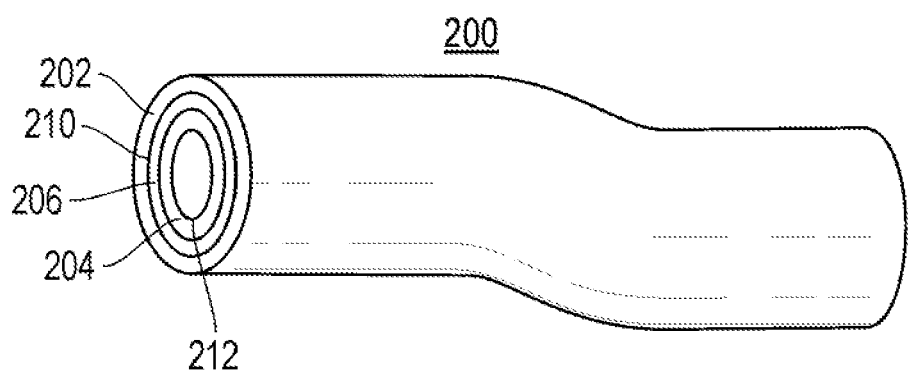

Alternatively, a composite tube 200 may include two or more layers, such as three layers. For example, FIG. 2 illustrates an adhesive layer 206 sandwiched between the inner layer 204 and the outer layer 202. The inner layer 204 includes an inner surface 212 that defines a central lumen of the tube configured for fluid contact. In an exemplary embodiment, the adhesive layer 206 is directly in contact with and may be directly bonded to the inner layer 204. In such an example, the adhesive layer 206 may directly contact and may be directly bonded to the outer layer 202 along an outer surface 210 of the adhesive layer 206.

For instance, the adhesive layer 206 may be any reasonable polymer. In an exemplary embodiment, the adhesive layer 206 includes a thermoplastic material. For instance, the thermoplastic material may include a thermoplastic elastomer, such as a cross-linkable elastomeric polymer of natural or synthetic origin. For example, an exemplary elastomeric material may include silicone, natural rubber, urethane, olefinic elastomer, diene elastomer, blend of olefinic and diene elastomer, fluoropolymer, perfluoroelastomer, or any combination thereof. Further exemplary adhesive layer 206 materials include a polymer including a silane, an anhydride, an acrylate, an epoxy, a vinyl, a hydride functionality, or combination thereof.

In an exemplary embodiment, the polymer of the adhesive layer may further include any reasonable additive such as a cross-linking agent, a co-agent, a photoinitiator, a filler, a plasticizer, a radiation stabilizer, or any combination thereof. Any co-agent is envisioned that increases and/or enhances crosslinking of the polymer composition of the adhesive layer. In a further embodiment, the use of a co-agent may provide desirable properties such as decreased permeation of small molecules and improved elastic recovery of the adhesive layer compared to an adhesive layer that does not include a co-agent. Any co-agent is envisioned such as, for example, bis-phenol AF, triaryl isocyanurate (TAIC), Triaryl cyanurate (TAC), an organic peroxide, 1,3 butylene glycol dimethacrylate, diethylene glycol dimethacrylate, zinc diacrylate, zinc methacrylate, or any combination thereof. Any reasonable amount of co-agent is envisioned. Alternatively, the adhesive layer may be substantially free of a crosslinking agent, a co-agent, a photoinitiator, a filler, a plasticizer, or a combination thereof. "Substantially free" as used herein refers to less than about 1.0% by weight, or even less than about 0.1% by weight of the total weight of the polymer of the adhesive layer.

Although illustrated as a two layer tube and a three layer tube, any number of additional layers is envisioned. For instance, the composite tube includes two layers, three layers, or even a greater number of layers. Typically, the additional layer has a thickness of at least about 2 mils to about 6000 mils. It will be appreciated that the thickness of the additional layer can be within a range between any of the minimum and maximum values noted above. Irrespective of the number of additional layers present, the outside diameter and inner diameter of the composite tube can have any values as defined for the composite tube 100 defined in FIG. 1. The number of layers is dependent upon the final properties desired for the composite tube.

Exemplary additional layers include, but are not limited to, a polymeric layer, a reinforcing layer, an adhesive layer, a barrier layer, a chemically resistant layer, a metal layer, any combination thereof, and the like. Any reasonable method of providing any additional layer is envisioned and is dependent upon the material chosen. For instance, the additional layer may be an additional polymeric layer of a thermoplastic elastomer that may or may not be extruded. In an embodiment, any number of polymeric layers is envisioned. Any number of additional layers is also envisioned.

In an embodiment, the first layer and the second layer of the composite tube may be formed by any reasonable means, such as extrusion, injection molding, or combination thereof. In a particular embodiment, the layers of the composite tube are formed via extrusion. Any reasonable extrusion system is envisioned. The extrusion system typically includes a pumping system and can include a number of devices that can be utilized to form at least two layers of the composite tube. For example, the pumping system can include a pumping device such as a gear pump, a static mixer, an extruder, a tube die, a radiation cure device, a post-processing device, or any combination thereof. In an embodiment, the polyolefin and optional additives may be melt processed by dry blending or compounding. In an embodiment, the dry blend may be in powder, granular, or pellet form. In a particular embodiment, to form the first layer of the composite tube, pellets of the corresponding monomer or polymer may be compounded with the cross-linking additive through a co-rotating intermeshing twin-screw extruder, cooled by a water bath, and cut into compound pellets. The first layer may be made by a continuous compounding process or batch related process. The resulting pellets of the blend are fed into an extruder with a tube die. The tube is extruded through the tube die, the tube having an inner surface that defines a central lumen of the tube.

When the composite tube includes multiple layers, each of the individual layers of the composite tube may be formed by any reasonable means and is dependent upon the material and the configured location of each of the individual layers. In an example, the first layer of a polyolefin elastomer is provided with the second layer formed thereon, as seen in FIG. 1. Typically, the polyolefin elastomer is provided by any reasonable means such as extrusion or injection molding as described. The polyolefin elastomer is formed into a layer, such as an inner layer of the composite tube.

After the inner layer is formed, the inner layer may be surface treated on an outer surface that is adjacent to the second layer. In a particular embodiment, the inner layer is surface treated prior to forming the second layer over the inner layer. The surface treatment is to increase the adhesion of the inner layer to the second layer when the inner layer is in direct contact with the second layer. In an embodiment, the surface treatment enables adhesion between the two layers to provide cohesive bonding, i.e. cohesive failure occurs wherein the structural integrity of the first layer and/or the second layer fails before the bond between the two materials fails. The surface treatment may include radiation treatment, chemical etch, physical-mechanical etch, plasma etch, corona treatment, chemical vapor deposition, or any combination thereof. In an embodiment, the outer surface of the first layer is free of any surface treatment. In an embodiment, the adhesion between the first layer and the second layer may be improved through the use of an adhesive layer. In an alternative embodiment, the surface between the first layer and the second layer are free of a primer.

In an embodiment, the second layer is formed by an extrusion system as described, which may be the same or different than the extrusion system used for the first layer. For instance, since the first layer has the inner surface that defines a central lumen of the tube, the second layer is extruded over the first layer. In an embodiment, a cross-head die is used to allow extrusion of at least one layer over an adjacent layer.

Although the second layer is described in this embodiment as being delivered after the first layer is provided, any order of delivery of the first layer and delivery of the second layer is envisioned. In an embodiment, the first layer and the second layer may be co-extruded.

In an embodiment, radiation crosslinking may be performed to cross-link the polyolefin elastomer. Radiation cross-linking may occur on the first layer prior to the second layer being provided. In an embodiment, radiation cross-linking may occur after the second layer is provided adjacent to the first layer. Any radiation is envisioned effective to crosslink the polyolefin elastomer of the first layer. The intralayer cros slinking of polymer molecules within the first layer provides a cured composition and imparts structural strength to the first layer of the composite tube. In addition, radiation may advantageous increase the bond between the first layer and the second layer, such as through interlayer crosslinking. In a particular embodiment, the combination of interlayer cros slinking bonds between the first layer and the second layer present an integrated composite tube that is highly resistant to delamination, has a high quality of adhesion resistant and protective surface, incorporates a minimum amount of adhesion resistant material, and yet, is physically substantial for convenient handling and deployment of the composite tube. The irradiation may be in a batch process or a roll-to-roll process.

In an embodiment, if a cross-linking agent is used to cross-link the polyolefin elastomer, any method and conditions are envisioned. Methods include thermal cross-linking under a controlled temperature with or without pressure to cross-link the polyolefin elastomer. Any temperature, pressure, or combination thereof is envisioned depending on the polyolefin elastomer and the cross-linking agent. Temperatures for thermal cross-linking include, for example, at least 50° C., such as at least 100° C., such as at least 200° C., or even greater than 240° C. In an embodiment, the temperature for thermal cross-linking is 240° C. to 280° C. Pressures for thermal cross-linking include, for example, at least 1 bar, such as at least 5 bar, such as at least 10 bar, or even greater than 12 bar. In an embodiment, the pressure for thermal cross-linking is 12 bar to 20 bar. In a particular embodiment, the cross-linking may include the presence of water and a possible catalyst.

In an exemplary embodiment, the composite tube may exhibit advantageous adhesive strength between the layers. For instance, when the first layer is in direct contact with the second layer, there is interlayer cross-linking between the first layer and the second layer. In a particular embodiment, the first layer and the second layer have an adhesive strength of cohesive failure.

In an embodiment, the cross-linked polyolefin elastomer may be formed into a single layer article, a multi-layer article, or can be laminated, coated, or formed on a substrate. Multi-layer articles may include layers such as a reinforcing layer, an adhesive layer, a barrier layer, a chemically resistant layer, a metal layer, any combination thereof, and the like. The cross-linked polyolefin elastomer can be formed into any useful shape such as film, sheet, tubing, and the like. The cross-linked polyolefin elastomer may adhere or bond to other substrates including the elastomer of the second layer.

In a particular embodiment, the cross-linked polyolefin elastomer is used to produce tubing and hoses. For instance, composite tubing including the cross-linked polyolefin elastomer advantageously exhibits desired properties such as chemical stability, flow stability, and increased lifetime. In a particular embodiment, the increased lifetime of the composite tube is unexpected when used as a peristaltic pump tube with a pump life that is greatly improved over conventional and commercially available peristaltic pump tubing. For example, the peristaltic pump tubing may have a pump life of at least about 200 hours, such as at least about 400 hours, such as at least about 500 hours, such as at least about 1000 hours, such as at least about 1500 hours, or even greater than 2000 hours as measured at 600 RPM using a L/S 17 Cole-Parmer peristaltic standard pump head and water as the pumping medium.

In an embodiment, the composite tubing such as a peristaltic pump tube produced by the cross-linked polyolefin elastomer has desirable tube wear characteristics such as minimal spallation (internal) and fouling (external). In particular, spallation results in the generation of particles and debris in the fluid path and fouling results in gumminess and tackiness of the pump head. In a particular embodiment, the tube wear characteristics has a spallation and fouling of less than about 1.0% weight loss when tested using a L/S 17 Cole-Parmer peristaltic standard pump head. In an exemplary embodiment, the composite tube may have less than about 40% loss in the delivery rate when tested for flow stability. In particular, the composite tube may have less than about 30% loss in the delivery rate. In an embodiment, the composite tube has a volumetric flow rate reduction of less than 30% of a post-break in flow rate, such as less than about 20%, such as less than about 10%, or even less than about 5% over its useful life when tested at 400 rpm on a Masterflex Easy-load II pump head.

In an embodiment, a composite tube including a second layer formed of an EPDM is particularly advantageous, also providing a desirable lifetime. Further, a composite tube including a liner formed of a cross-linked polyolefin is particularly advantageous, providing lifetime and low permeability properties. In an embodiment, the liner is formed of a cross-linked polyethylene-based elastomer.

In an embodiment, the resulting composite tube may have further desirable physical and mechanical properties. For instance, the composite tube is flexible and kink-resistant. Clarity of the composite tube is checked visually and classified into four levels in terms of transparency: clear, translucent, hazy, and opaque. In particular, the resulting peristaltic pump tubes have desirable flexibility. For instance, the composite tube of the polymeric composition may advantageously produce low durometer tubes. For example, a composite tube having a Shore A durometer of between about 35 and about 75, such as between about 60 to about 75 as measured by ASTM D2240 having desirable mechanical properties may be formed. Such properties are indicative of a flexible material.

In addition to desirable hardness, the composite tube has advantageous physical properties, such as a balance of any one or more of the properties of hardness, flexibility, surface lubricity, pump life, spallation, fouling, tensile strength, elongation, Shore A hardness, gamma resistance, weld strength, and seal integrity to an optimum level.

In an embodiment, the resulting composite tube has desirable heat stability properties. In a particular embodiment, the resulting composite tube has one more of the following heat resistance properties such as a higher burst resistance, a higher softening point, and/or a higher autoclaving temperature compared to currently available commercial products.

In exemplary embodiments, the composite tube can be used in a variety of applications. Applications for the composite tube are numerous. In particular, the non-toxic nature of the composite tube makes the composite tube useful for any application where toxicity is undesired. For instance, the composite tube has potential for FDA, ADCF, USP Class VI, NSF, European Pharmacopoeia compliant, United States Pharmacopoeia (USP) compliant, USP physiochemical compliant, ISO 10993 Standard for evaluating biocompatibility of a medical device, and other regulatory approvals. In a particular embodiment, the composite tube is non-cytotoxic, non-hemolytic, non-pyrogenic, animal-derived component-free, non-mutagenic, non-bacteriostatic, non-fungistatic, or any combination thereof.

In an embodiment, the composite tube may be used in applications such as industrial, medical applications, health care, biopharmaceutical, drinking water, food & beverage applications, dairy applications, laboratory applications, FDA applications, warewashing applications, industrial cleaning applications, cell culture applications, and the like. In an exemplary embodiment, the composite tube may be used in applications as a chemically resistant peristaltic pump or transfer tube. In a particular embodiment, the composite tube may be used in applications such as a fluid transfer tube in food and beverage processing equipment, a fluid transfer tube in medical and health care, biopharmaceutical manufacturing equipment, and peristaltic pump tube for medical, laboratory, and biopharmaceutical applications. In a particular embodiment, the composite tube is used in applications including warewash cleaning, laundry cleaning, facility cleaning, digital printing, fuel transfer, medical fluid transfer, pharmaceutical fluid transfer, biopharmaceutical fluid transfer, electronics chemical processing, composite manufacturing, or combination thereof.

In a particular embodiment, a fluid source, such as a container, reactor, reservoir, tank, or bag, is coupled to a composite tube. The composite tube may engage a pump, fitting, valve, dispenser, or another container, reactor, reservoir, tank, or bag. In an example, the composite tube may be coupled to a water container and may have a dispenser fitting on the distal end. In another example, the composite tube may be coupled to a fluid bag and coupled to a valve at the distal end. In a further example, the composite tube may be coupled to a container, be engaged in a pump, and be coupled to a second container at a distal end.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1. A composite tube including: a first layer including a cross-linked polyolefin elastomer, wherein the first layer is configured for fluid contact; and a second layer adjacent to the first layer, the second layer including an elastomer.

Embodiment 2. A method of forming a composite tube, including: providing a first layer including a polyolefin elastomer; providing a second layer including an elastomer overlying the first layer; and crosslinking at least the first layer with a radiation source, a cross-linking agent, or combination thereof to substantially cross-link the polyolefin elastomer.

Embodiment 3. The composite tube or the method in accordance with embodiments 1 or 2, wherein the cross-linked polyolefin elastomer includes a C2-C10 carbon-based elastomer.

Embodiment 4. The composite tube or the method in accordance with embodiment 3, wherein the cross-linked polyolefin elastomer includes polypropylene, polyethylene, a copolymer of ethylene with propylene, a copolymer of ethylene with an alpha-olefin, a copolymers of ethylene with a polar vinyl monomer, a terpolymer of ethylene, maleic anhydride, and an acrylate, an ionomer of ethylene and acrylic acid and an optional third monomer, an ionomer of ethylene and methacrylic acid and an optional third monomer, or combination thereof.

Embodiment 5. The composite tube or the method of forming the composite tube in accordance with embodiment 4, wherein the cross-linked polyolefin elastomer consists essentially of polypropylene, polyethylene, a copolymer of ethylene with propylene, a copolymer of ethylene with an alpha-olefin, a copolymer of ethylene with a polar vinyl monomer, a terpolymer of ethylene, maleic anhydride, and an acrylate, an ionomer of ethylene and acrylic acid and an optional third monomer, an ionomer of ethylene and methacrylic acid and an optional third monomer, or combination thereof.

Embodiment 6. The composite tube or the method of forming the composite tube in accordance with embodiment 5, wherein the cross-linked polyolefin elastomer consists of polypropylene, polyethylene, a copolymer of ethylene with propylene, a copolymer of ethylene with an alpha-olefin, a copolymer of ethylene with a polar vinyl monomer, a terpolymer of ethylene, maleic anhydride, and an acrylate, an ionomer of ethylene and acrylic acid and an optional third monomer, an ionomer of ethylene and methacrylic acid and an optional third monomer, or combination thereof.

Embodiment 7. The composite tube or the method of forming the composite tube in accordance with any of the preceding embodiments, wherein the cross-linked polyolefin elastomer is cross-linked via the cross-linking agent, wherein the cross-linking agent includes a peroxide, an azo compound, a silane, or combination thereof.

Embodiment 8. The composite tube or the method of forming the composite tube in accordance with embodiment 7, wherein the peroxide is present in the polyolefin elastomer at an amount of about 0.2 phr to about 5 phr, such as about 1 phr to about 3 phr.

Embodiment 9. The composite tube or the method of forming the composite tube in accordance with any of the preceding embodiments, wherein the cross-linked polyolefin elastomer has a melting temperature of greater than 80° C.

Embodiment 10. The composite tube or the method of forming the composite tube in accordance with any of the preceding embodiments, wherein the cross-linked polyolefin elastomer has a glass transition temperature (Tg) of less than 0° C., such as less than −20° C.

Embodiment 11. The composite tube or the method of forming the composite tube in accordance with any of the preceding embodiments, wherein the cross-linked polyolefin elastomer has a flexural modulus of less than 10,000 pounds per square inch (psi), such as less than 8,000 psi.

Embodiment 12. The composite tube or method of forming the composite tube in accordance with any of the preceding embodiments, wherein the elastomer of the second layer includes a polystyrene, a polyester, a silicone copolymer, a silicone thermoplastic vulcanizate, a copolyester, a polyamide, a fluoropolymer, a polyethylene, a polypropylene, a polyether-ester copolymer, a thermoplastic urethane, a polyether amide block copolymer, a polyamide copolymer, a styrene block copolymer, a polycarbonate, a polyolefin elastomer, a diene elastomer, a thermoplastic vulcanizate, an ionomer, a polyoxymethylene (POM), an acrylonitrile butadiene styrene (ABS), an acetal, an acrylic, a polyvinyl chloride (PVC), or combination thereof.

Embodiment 13. The composite tube or the method of forming the composite tube in accordance with any of the preceding embodiments, wherein the first layer is in direct contact with the second layer.

Embodiment 14. The composite tube or the method of forming the composite tube in accordance with embodiment 13, including interlayer cross-linking between the first layer and the second layer.

Embodiment 15. The composite tube or the method of forming the composite tube in accordance with embodiment 13, wherein the first layer and the second layer have an adhesive strength of cohesive failure.

Embodiment 16. The composite tube or method of forming the composite tube in accordance with embodiments 1-12, wherein the composite tube includes an adhesive layer disposed between the first layer and the second layer.

Embodiment 17. The composite tube or method of forming the composite tube in accordance with embodiment 16, wherein the adhesive layer includes a polymer including a silane, an anhydride, an acrylate, an epoxy, a vinyl, or a hydride functionality.

Embodiment 18. The composite tube or the method of forming the composite tube in accordance with any of the preceding embodiments, wherein the radiation source includes e-beam irradiation, gamma irradiation, x-ray irradiation, or combination thereof.

Embodiment 19. The composite tube or the method of forming the composite tube in accordance with any of the preceding embodiments, wherein the composite tube is a chemically resistant peristaltic pump or transfer tube.

Embodiment 20. The composite tube or the method of forming the composite tube in accordance with embodiment 19, wherein the composite tube is used in an application including warewash cleaning, laundry cleaning, facility cleaning, digital printing, fuel transfer, medical fluid transfer, pharmaceutical fluid transfer, biopharmaceutical fluid transfer, electronics chemical processing, composite manufacturing, or combination thereof.

Embodiment 21. The composite tube or the method of forming the composite tube in accordance with any of the preceding embodiments, wherein the composite tube has a peristaltic flow rate that changes by less than about 30%, such as less than about 20%, such as less than about 10%, or even less than about 5% over its useful life.

Embodiment 22. The method of forming the composite tube in accordance with embodiment 2, wherein providing the first layer comprising the polyolefin elastomer includes: optionally mixing a cross-linking agent comprising a peroxide, an azo compound, a silane, or combination thereof with the polyolefin elastomer; and extruding the polyolefin elastomer.

Embodiment 23. The method of forming the composite tube in accordance with embodiment 22, wherein the polyolefin elastomer is cross-linked by thermal treatment at a temperature greater than 50° C.

Embodiment 24. The method of forming the composite tube in accordance with embodiment 2, wherein providing the elastomer includes extruding the elastomer.

Embodiment 25. The method of forming the composite tube in accordance with embodiments 2-24, wherein the first layer and the second layer are co-extruded.

Embodiment 26. The method of forming the composite tube in accordance with embodiment 2, wherein the step of irradiating at least the first layer with a radiation source occurs prior to the step of providing the second layer.

Embodiment 27. The method of forming the composite tube in accordance with embodiment 2, wherein the step of irradiating at least the first layer with a radiation source occurs after the step of providing the second layer.

Embodiment 28. The method of forming the composite tube in accordance with embodiment 2, further including treating an outer surface of the first layer prior to the step of forming the second layer.

Embodiment 29. The method of forming the composite tube in accordance with embodiment 28, wherein treating the outer surface includes chemical etching, physical-mechanical etching, plasma etching, corona treatment, chemical vapor deposition, or combination thereof.

Embodiment 30. An apparatus, including: a composite tube according to embodiment 1; and a pump coupled to the tube to dispense fluid contained in the tube.

Embodiment 31. The apparatus or the method as recited in accordance with embodiment 30, wherein the pump is a peristaltic pump.

Embodiment 32. A composite tube including: a first layer including a cross-linked polyethylene-based elastomer; and a second layer adjacent to the first layer, the second layer including a polyolefin elastomer.

Embodiment 33. The composite tube in accordance with embodiment 32, wherein the polyolefin elastomer includes an ethylene propylene diene monomer (EPDM).

The concepts described herein will be further described in the following examples, which do not limit the scope of the disclosure described in the claims. The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

The following samples were prepared:
Example 1: Ethylene copolymer liners were extruded, e-beamed, and then jacketed with a TPV.
Example 2: Ethylene copolymer liners were co-extruded with EPDM blends (jacket) and then radiation cross-linked.
Example 3: Ethylene copolymer liners were co-extruded with radiation stabilized TPV and then crosslinked.

The Examples are tested for physical properties and have advantageous properties.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A composite tube comprising:
   a first layer comprising a cross-linked polyolefin elastomer, wherein the first layer is configured for fluid contact, wherein the cross-linked polyolefin elastomer has a flexural modulus of less than 10,000 pounds per square inch (psi); and
   a second layer adjacent to the first layer, the second layer comprising an elastomer.

2. The composite tube in accordance with claim 1, wherein the cross-linked polyolefin elastomer comprises a C2-C10 carbon-based elastomer.

3. The composite tube in accordance with claim 2, wherein the cross-linked polyolefin elastomer comprises polypropylene, polyethylene, a copolymer of ethylene with propylene, a copolymer of ethylene with an alpha-olefin, a copolymer of ethylene with a polar vinyl monomer, a terpolymer of ethylene, maleic anhydride, and an acrylate, an ionomer of ethylene and acrylic acid and optionally a third monomer, an ionomer of ethylene and methacrylic acid and optionally a third monomer, or combination thereof.

4. The composite tube in accordance with claim 1, wherein the cross-linked polyolefin elastomer is cross-linked via the cross-linking agent, wherein the cross-linking agent comprises a peroxide, an azo compound, a silane, or combination thereof.

5. The composite tube in accordance with claim 4, wherein the peroxide is present in the polyolefin elastomer at an amount of about 0.2 phr to about 5 phr.

6. The composite tube in accordance with claim 1, wherein the cross-linked polyolefin elastomer has a melting temperature of greater than 80° C.

7. The composite tube in accordance with claim 1, wherein the cross-linked polyolefin elastomer has a glass transition temperature (Tg) of less than 0° C.

8. The composite tube in accordance with claim 1, wherein the flexural modulus is less than 8,000 psi.

9. The composite tube in accordance with claim 1, wherein the elastomer of the second layer comprises a polystyrene, a polyester, a silicone copolymer, a silicone thermoplastic vulcanizate, a copolyester, a polyamide, a fluoropolymer, a polyethylene, a polypropylene, a polyether-ester copolymer, a thermoplastic urethane, a polyether amide block copolymer, a polyamide copolymer, a styrene block copolymer, a polycarbonate, a polyolefin elastomer, a diene elastomer, a thermoplastic vulcanizate, an ionomer, a polyoxymethylene (POM), an acrylonitrile butadiene styrene (ABS), an acetal, an acrylic, a polyvinyl chloride (PVC), or combination thereof.

10. The composite tube in accordance with claim 1, wherein the first layer is in direct contact with the second layer.

11. The composite tube in accordance with claim 10, comprising interlayer cross-linking between the first layer and the second layer.

12. The composite tube in accordance with claim 10, wherein the first layer and the second layer have an adhesive strength of cohesive failure.

13. The composite tube in accordance with claim 1, wherein the composite tube comprises an adhesive layer disposed between the first layer and the second layer.

14. The composite tube in accordance with claim 13, wherein the adhesive layer comprises a polymer comprising a silane, an anhydride, an acrylate, an epoxy, a vinyl, or a hydride functionality.

15. The composite tube in accordance with claim 1, wherein the composite tube is a chemically resistant peristaltic pump or transfer tube.

16. The composite tube in accordance with claim 1, wherein the composite tube has a peristaltic flow rate that changes by less than about 30% over its useful life.

17. A method of forming a composite tube, comprising:
    providing a first layer comprising a polyolefin elastomer, wherein the cross-linked polyolefin elastomer comprises a C2-C10 carbon-based elastomer;
    providing a second layer comprising an elastomer overlying the first layer; and
    crosslinking at least the first layer with a radiation source, a cross-linking agent, or combination thereof to substantially cross-link the polyolefin elastomer.

18. The method of forming the composite tube in accordance with claim 17, wherein providing the first layer comprising the polyolefin elastomer comprises:
    optionally mixing a cross-linking agent comprising a peroxide, an azo compound, a silane, or combination thereof with the polyolefin elastomer; and
    extruding the polyolefin elastomer.

19. The method of forming the composite tube in accordance with claim 18, wherein the polyolefin elastomer is cross-linked by thermal treatment at a temperature greater than 50° C.

20. The method of forming the composite tube in accordance with claim 17, wherein the radiation source comprises e-beam irradiation, gamma irradiation, x-ray irradiation, or combination thereof.

* * * * *